R. F. HALLIWELL.
SPEED GOVERNOR.
APPLICATION FILED SEPT. 4, 1909.
993,982.
Patented May 30, 1911.
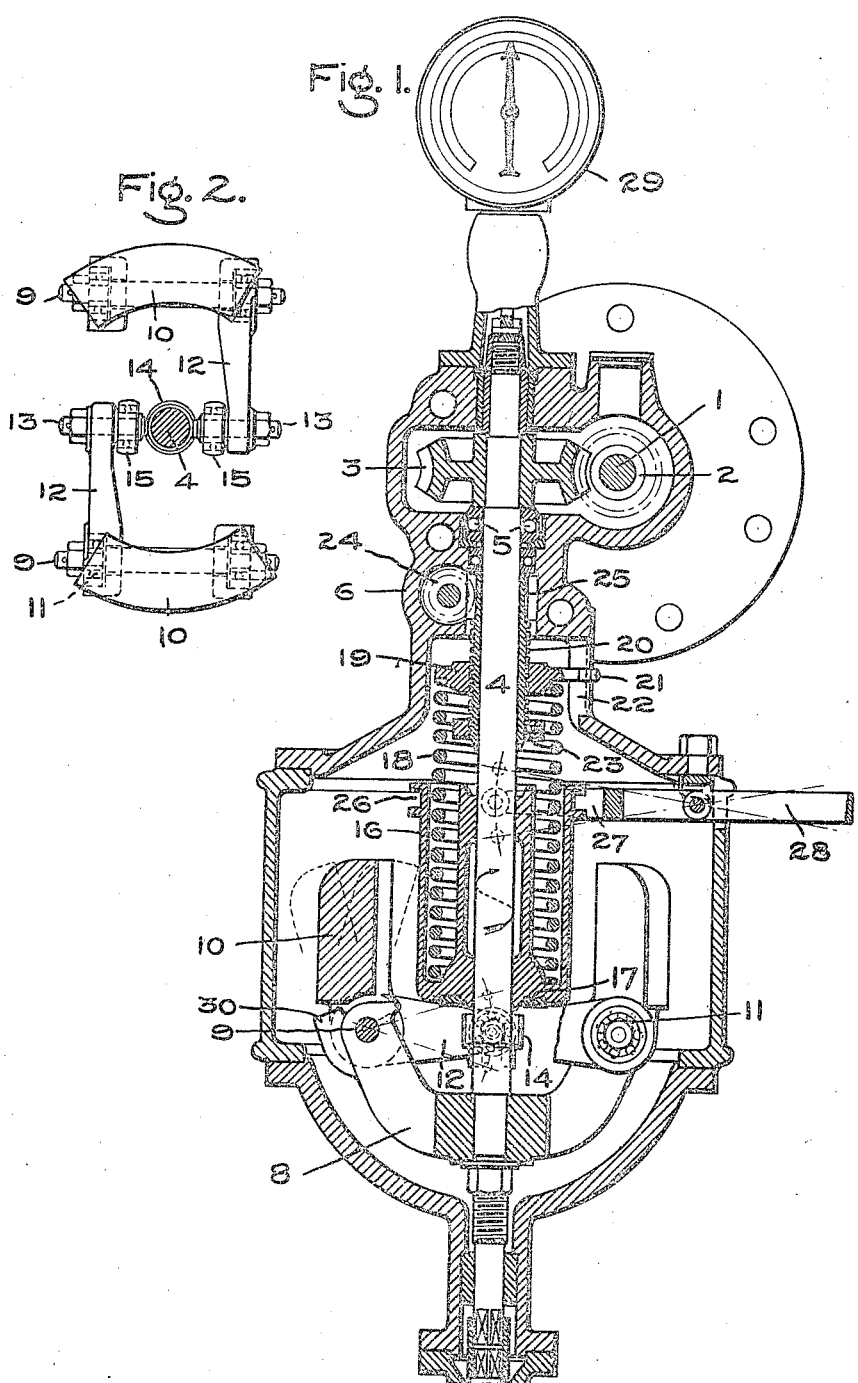
Witnesses:
Marcus L. Byng.
J. Ellis Glen
Inventor,
Reginald F. Halliwell,
by Albert G. Davis
Att'y.

UNITED STATES PATENT OFFICE.

REGINALD F. HALLIWELL, OF RUGBY, ENGLAND, ASSIGNOR TO GENERAL ELECTRIC COMPANY, A CORPORATION OF NEW YORK.

SPEED-GOVERNOR.

993,982.

Specification of Letters Patent.   Patented May 30, 1911.

Application filed September 4, 1909.   Serial No. 516,251.

*To all whom it may concern:*

Be it known that I, REGINALD F. HALLIWELL, a subject of the King of Great Britain, residing at Rugby, England, have invented certain new and useful Improvements in Speed-Governors, of which the following is a specification.

This invention relates to mechanism for governing the speed of prime movers, and especially to governors of the centrifugal flyball type.

The object I have in view is to reduce the number and weight of the moving parts so as to increase the sensitiveness of the device and improve its accuracy of operation. To this end I confine the rotating elements of my governor to the spindle and the pivoted weighted arms carried thereby, the spring and transmitting lever being non-rotatable.

In the accompanying drawing, Figure 1 is a vertical longitudinal section of my improved speed governor, and Fig. 2 is a plan view of the weighted arms, the spindle being shown in cross-section.

The governor is shown as applied to a prime mover having a horizontal shaft 1, such, for example, as the shaft of a horizontal steam turbine. Suitable gearing, such as the worm 2 and worm gear 3, connects the shaft 1 to the upright spindle 4 of the governor and imparts rotation thereto. The spindle is journaled, preferably on ball bearings 5, in a casing 6. At its lower end it is preferably connected to a pump 7 which supplies lubricant to the bearings of the turbine.

A two-armed yoke 8 is rigidly secured to the spindle, and at its ends are carried the parallel transverse pins 9 on which are pivoted the upright weights 10, preferably by means of ball bearings 11. The weights are preferably curved in arcs of revolution around the spindle. Each weight is provided with a horizontal rock-arm 12, extending tangentially to the spindle 4. Studs 13 are firmly secured in the ends of said arms in positions radial to the spindle. Their inner ends are supported in holes in a sleeve 14 which has a sliding fit on the spindle. This construction compels the two arms 12 to rise and fall together as the weights move out or in, the sleeve turning slightly on the spindle as the arms move up or down from the horizontal. On each stud is journaled a roller 15, preferably on ball bearings, as shown.

Immediately above the arms is located an annular cup 16 concentric with and sleeved on the spindle and resting on the rollers 15. A hardened steel ring 17 is preferably set into the bottom of said cup to serve as a track or race for said rollers: because the cup does not rotate with the spindle but merely slides up and down thereon as the revolving arms rise and fall with the movements of the centrifugally actuated weights.

The cup serves as one abutment for the helical spring 18 which surrounds the spindle and is seated in said cup, abutting at its upper end against a nut 19 which meshes with a screw threaded sleeve 20 concentric with the spindle, and rotatable for the purpose of carrying said nut along the spindle to adjust the tension of the spring. The nut is prevented from rotating by a radial arm 21 engaging with a longitudinal slot 22 in the casing. A collar 23 at the lower end of the sleeve prevents the nut from working off. For turning the sleeve I prefer to use a worm 24 meshing with a worm gear 25 on said sleeve. The cup 16 has an external groove 26 receiving trunnions on a fork 27 at the inner end of the lever 28 by means of which the movements of the governor are communicated, in any suitable manner, to the valve mechanism of the prime mover. At the upper end of the spindle is a speed indicator 29 of any approved type.

The operation is as follows: The spindle 4 is driven by the gearing 2 3, and revolves the yoke 8 carrying the weights 10 which tilt outwardly under the influence of centrifugal force as the speed of the spindle increases. The range of movement of said weights is limited by stops 30 on the arms of the yoke 8. The rollers 15 at the inner ends of the revolving arms 12 roll on the circular track 17 in the under side of the cup 16. When said cup is lifted by the arms, the spring 18 is compressed. The tension of said spring is adjusted by turning the sleeve 20 by means of the worm gearing 24 25, which causes the nut 19, forming the upper abutment for the spring, to ride up or down along the spindle. This adjustment can be made while the governor is running; the position of the arm 21 in the slot 22 being an index of the amount of tension on the spring.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is,—

1. A centrifugal speed governor, comprising a rotatable spindle, weights pivoted thereon, arms actuated by said weights, a non-rotatable sliding abutment surrounding said spindle and resting directly on said arms, and a spring bearing on said abutment.

2. In a centrifugal speed governor, the combination with a spindle, of a spring surrounding the same, a non-rotatable abutment for said spring adjustable along said spindle, a non-rotatable abutment sliding freely on said spindle, and centrifugally-actuated weights revolving with said spindle and operating directly against said latter abutment.

3. In a centrifugal speed governor, the combination with a spindle, of a spring surrounding the same, a non-rotatable upper abutment for said spring adjustable along said spindle, a non-rotatable cup receiving the lower end of said spring and sliding freely on said spindle, weights pivotally mounted on said spindle, and arms moving with said weights and bearing directly against the under side of said cup, the arrangement of the pivots of said weights and the bearings between said arms and the cup being such that the relative displacement of said arms and weights at their bearing due to centrifugal movement of the weights is at least approximately in the same direction as the movement of the bearing portion of said arms about the spindle.

4. In a centrifugal speed governor, the combination with a spindle, of a yoke thereon, upright weights pivoted on said yoke, arms extending inwardly from said weights, rollers on said arms, a cup sliding on said spindle and resting on said rollers, the axis of said rollers extending in a direction at least approximately radial with reference to said spindle, a spring surrounding said spindle and seated in said cup, and an upper abutment for said spring.

5. In a centrifugal speed governor, the combination with a spindle, of a yoke thereon, weights pivoted on said yoke, arms extending inwardly from said weights, a sleeve loose on said spindle, and studs in said arms extending into holes in said sleeve.

6. In a centrifugal speed governor, the combination with a spindle, of a spring surrounding the same, a screwthreaded sleeve concentric with said spindle, a non-rotatable nut on said sleeve serving as an abutment for said spring, and gearing for rotating said sleeve.

7. A centrifugal speed governor comprising a rotatable spindle, weights pivoted thereon, arms actuated by said weights, a non-rotatable sliding abutment resting on said arms, a spring bearing on said abutment, and means independent of said abutment for causing said weights to move in unison.

8. In a centrifugal speed governor, the combination with a spindle of a spring surrounding the same, a non-rotatable abutment for said spring adjustable along said spindle, a rotatable member having external threads engaging said adjustable abutment and suitably secured against movement longitudinally of said shaft, a non-rotatable abutment sliding on said spindle, and centrifugally actuated weights revolving with said spindle and operating against said latter abutment.

9. In a centrifugal speed governor, the combination with a spindle of a spring surrounding the same, a non-rotatable abutment for one end of said spring adjustable along said spindle, a non-rotatable abutment for the other end of said spring sliding freely on said spindle, weights pivotally mounted on said spindle, arms moving with said weights and bearing against said last mentioned abutment, and a stationary casing inclosing the parts aforesaid by which rotation of said adjustable abutment is prevented and a bearing afforded for means for transmitting the movements of the abutment acted upon by said arms.

In witness whereof, I have hereunto set my hand this 24th day of August, 1909.

REGINALD F. HALLIWELL.

Witnesses:
CHARLES H. FULLER,
J. A. FOSTER.